United States Patent [19]
Grieshop

[11] Patent Number: 6,017,182
[45] Date of Patent: *Jan. 25, 2000

[54] AUGER UNIT FOR A GRANULAR MATERIAL TRANSPORT WAGON

[75] Inventor: Maurice Grieshop, Ft. Recovery, Ohio

[73] Assignee: J. & M. Manfacturing Co., Inc., Ft. Recovery, Ohio

[ * ] Notice: This patent is subject to a terminal disclaimer.

[21] Appl. No.: 09/078,730

[22] Filed: May 14, 1998

Related U.S. Application Data

[63] Continuation of application No. 08/829,987, Apr. 1, 1997, which is a continuation of application No. 08/561,888, Nov. 22, 1995, Pat. No. 5,615,990, which is a continuation of application No. 08/293,547, Aug. 22, 1994, abandoned.

[51] Int. Cl.[7] ..................................... B60P 1/40
[52] U.S. Cl. ................... 414/526; 414/523; 198/550.1
[58] Field of Search ................... 414/526, 504, 414/326, 523; 198/550.1, 668; 285/223, 261, 263, 278, 280

[56] References Cited

U.S. PATENT DOCUMENTS

| | | | |
|---|---|---|---|
| 404,780 | 6/1889 | Dowd | 285/280 X |
| 2,710,204 | 6/1955 | Faith-Ell | 285/278 X |
| 3,265,253 | 8/1966 | Niewold | 414/526 X |
| 3,391,778 | 7/1968 | Lasiter | 414/526 X |
| 3,813,477 | 5/1974 | Fischer | 285/223 X |
| 3,958,649 | 5/1976 | Bull et al. | 285/223 X |
| 4,286,530 | 9/1981 | Conley | 414/526 X |
| 5,340,265 | 8/1994 | Grieshop | 414/526 X |
| 5,615,990 | 4/1997 | Grieshop | 414/526 |

*Primary Examiner*—Stephen T. Gordon
*Attorney, Agent, or Firm*—Jacox, Meckstroth & Jenkins

[57] ABSTRACT

A wheel supported wagon includes a gravity discharge container or hopper for directing grain, feed, dry fertilizer or other granular material into a receiving box mounted on the side of the hopper. An inclined elongated auger unit includes a tubular conduit enclosing a hydraulically driven auger, and the lower end portion of the conduit has an inwardly projecting and upwardly curved annular upper flange. The flange seats on a downwardly projecting and outwardly curved lower flange forming part of an annular auger support member projecting downwardly from the material receiving box. The mating flanges provide for rotating the auger unit on a vertical axis and also for tilting the auger unit in a vertical plane at any selected rotational position.

6 Claims, 2 Drawing Sheets

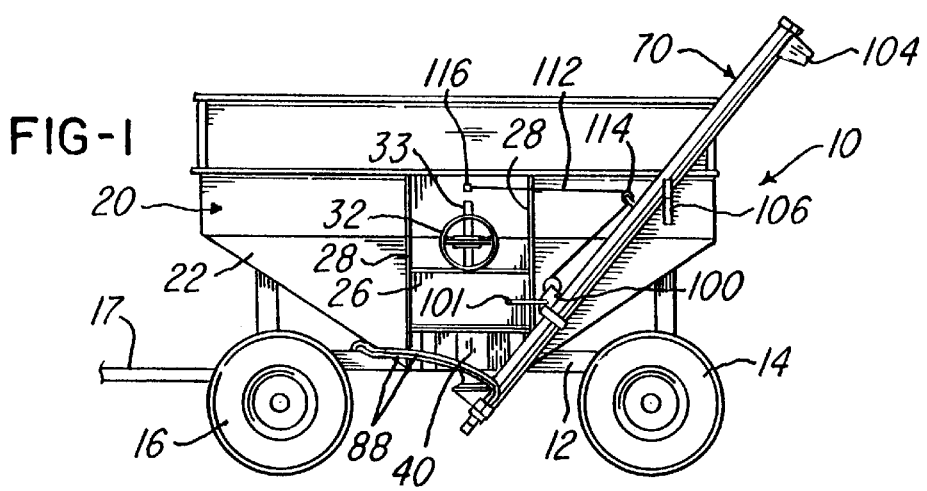
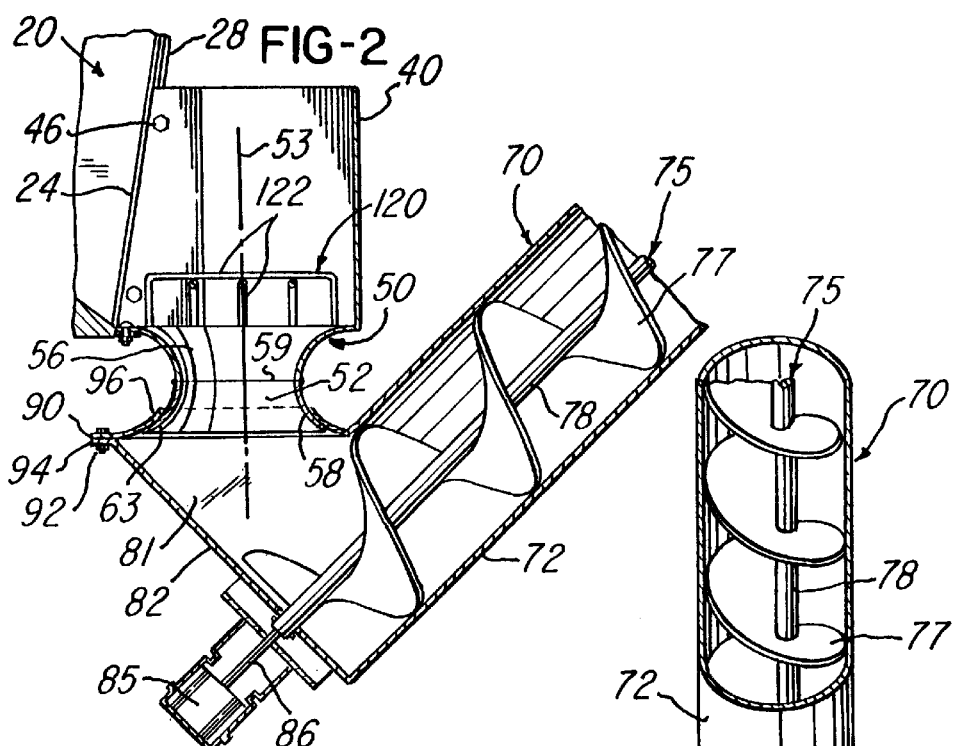
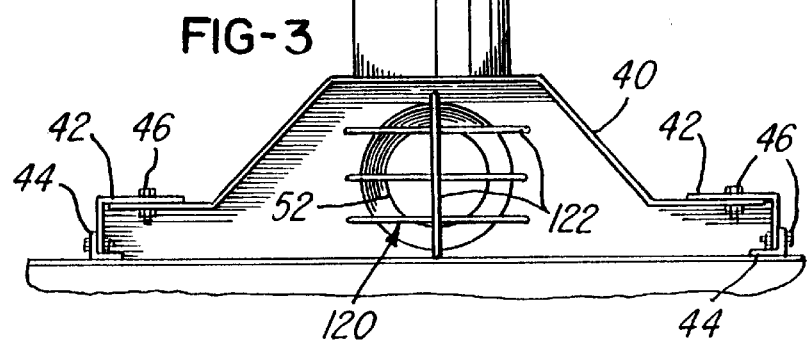

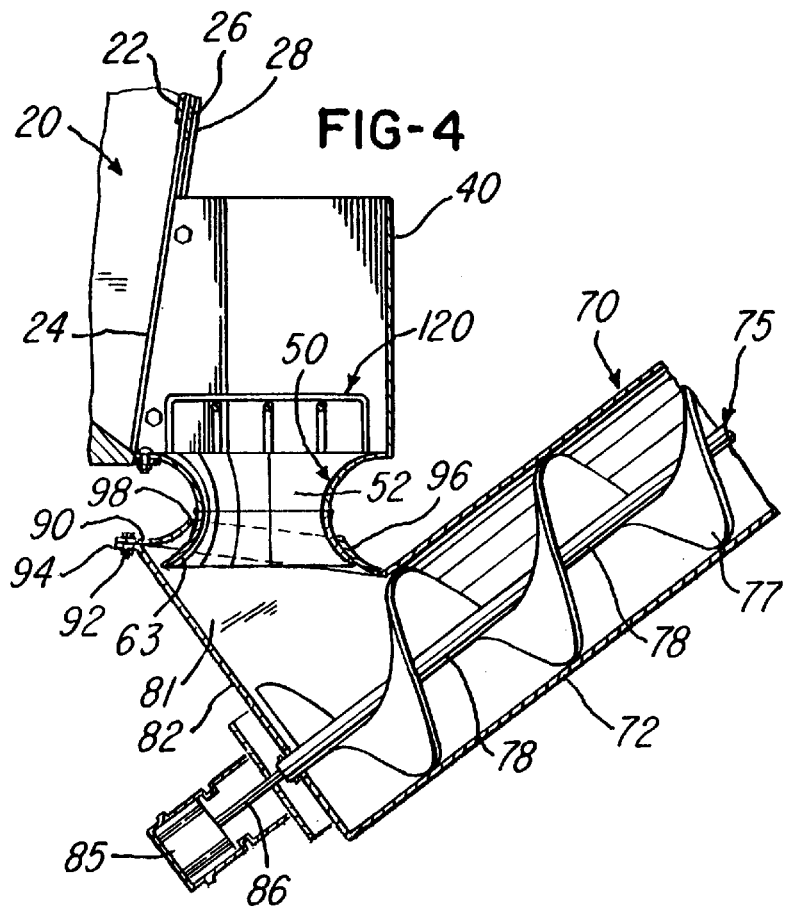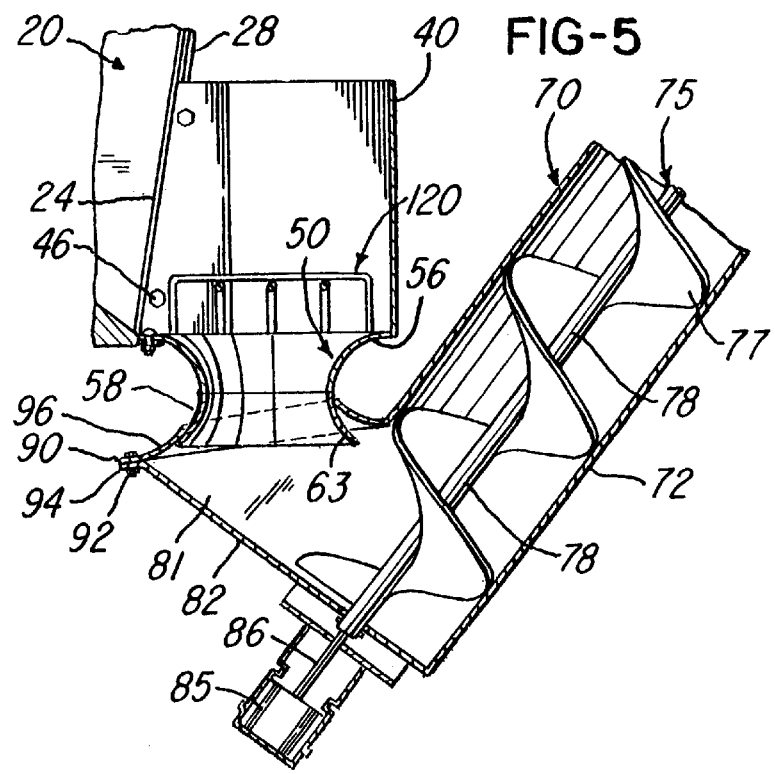

AUGER UNIT FOR A GRANULAR MATERIAL TRANSPORT WAGON

RELATED APPLICATION

This application is a continuation of application Ser. No. 08/829,987, filed Apr. 1, 1997, which is a continuation of application Ser. No. 08/561,888, filed Nov. 22, 1995, U.S. Pat. No. 5,615,990, which is a continuation of Ser. No. 293,547, filed Aug. 22, 1994, abandoned.

BACKGROUND OF THE INVENTION

This invention relates to grain wagons with unloading conveyors or augers, for example, of the general type disclosed in U.S. Pat. No. 5,340,265 which issued to the assignee of the present invention. A number of the references cited in this patent disclose side discharge wagons, for example, as disclosed in U.S. Pat. No. 3,265,253. Such wagons are commonly used for hauling or transporting grain, feed, dry fertilizer or other granular material, and include a gravity discharge container or hopper having a gate-controlled discharge opening within an inclined side wall of the hopper at the bottom of the hopper. The material flows from the hopper through the opening and into a side mounted open top receiving box.

An elongated auger unit includes a tubular housing or conduit enclosing a hydraulically driven auger, and a lower inlet portion of the auger unit is inserted into the material receiving box. As shown in U.S. Pat. No. 3,265,253, the material receiving box is attached to the lower end portion of the auger conduit and is pivotally connected to the bottom of the hopper adjacent the side wall outlet. Another form of unloading auger unit is disclosed in U.S. Pat. No. 3,391,778. In this patent, the lower end portion of the auger conduit is connected to an upwardly projecting and part-spherical ball member which seats within a mating part-spherical annular socket projecting downwardly from a material receiving box. The part-spherical ball and socket support for the auger unit permits the unit to be rotated on a generally vertical axis and also tilted in a vertical plane extending through the axis. However, the part-spherical ball and socket support for the auger unit is difficult and expensive to construct, especially to obtain precise matching of the ball and socket. The mating part-spherical ball and socket arrangement also presents a problem when granular dry fertilizer seeps into any gaps between the ball and socket and then compacts and restricts movement. This causes binding of the ball to the socket and prevents free movement or swiveling of the auger unit.

SUMMARY OF THE INVENTION

The present invention is directed to an improved power driven conveyor or auger unit which is ideally suited for use in transporting granular material within a hopper of a wheel supported wagon to a planter or bins which receive grain and/or dry fertilizer. The auger unit of the invention is not only simple and economical in construction, but is also reliable and dependable in operation. In addition, the auger unit may be conveniently moved to different rotational positions and to different angular or inclined positions to provide for conveniently depositing the granular material to desired locations, in addition to positioning the auger unit in a stow position.

In accordance with one embodiment of the invention, the above advantages and features are provided by an inclined auger unit which includes an elongated tubular conduit enclosing a helical auger driven by a hydraulic motor mounted on the lower end portion of the conduit. A plate is attached to the lower end portion of the auger conduit and includes an inwardly projecting and upwardly curved annular flange which rests or seats upon a downwardly projecting and outwardly curved annular flange forming part of an auger support member having an hour-glass cross-sectional configuration. The annular auger support member projects downwardly from the bottom wall of a material receiving box which is mounted on the side wall of a wagon hopper adjacent a bottom discharge opening within the side wall. The upper and lower annular support flanges provide for easily rotating the auger unit on the auger support member and for easily tilting the auger unit in a vertical plane at any selected rotational position of the auger unit.

Other features and advantages of the invention will be apparent from the following description, the accompanying drawings and the appended claims.

BRIEF DESCRIPTION OF THE DRAWINGS

FIG. 1 is a side elevational view of a wheel supported grain wagon having a hopper with a side discharge opening and incorporating a power driven auger unit constructed in accordance with the invention;

FIG. 2 is an enlarged fragmentary vertical section of the auger unit show in on FIG. 1;

FIG. 3 is a plan view of the portion of the auger unit shown in FIG. 2; and

FIGS. 4 and 5 are fragmentary section views similar to FIG. 2 and illustrating tilted positions of the auger unit in a vertical plane.

DESCRIPTION OF THE PREFERRED EMBODIMENT

FIG. 1 illustrates a cart or wagon 10, commonly referred to as a grain wagon, and which includes a frame 12 supported by a pair of rear wheels 14 and a pair of front wheels 16. The front wheels are steerable by a tow bar 17 which is usually hitched to a tow vehicle, such as the tractor shown in above mentioned U.S. Pat. No. 5,340,265 and used for pulling the wagon 10. The frame 12 supports a gravity discharge container or hopper 20 having a slightly inclined left side wall 22 with a rectangular bottom discharge opening 24 (FIG. 2). A rectangular gate-type door or closure 26 is supported for sliding movement by a set of tracks 28 mounted on the side wall 22 for opening and closing the discharge opening 24. The closure 26 is moved by rotation of a hand wheel 32 which is connected to the closure by a rack 33 and pinion (not shown) rotated by the wheel 32. When the container or hopper 20 is filled with a granular material such as grain or fertilizer, the material is discharged by gravity through the side wall opening 24 as a result of the sloping bottom walls of the hopper 20.

Referring to FIGS. 2 and 3, a gravity flow material receiving housing or box 40 has an open top and is secured to the side wall 22 of the hopper 20 by a set of angular end plates 42 (FIG. 3) and a set of angular mounting strips 44 which are welded to the side wall 22 of the hopper. A series of bolts 46 secure the box 40 to the end plates 42 and to the mounting strips 44 so that the material discharge through the opening 24 is first received within the outboard box 40.

An annular conveyor or auger support member 50 has generally an hour-glass cross-sectional configuration and projects downwardly from the box 40, as shown in FIG. 2. The throat of the support member 50 defines a horizontal circular opening 52 (FIG. 3) and has a vertical axis 53. The member is formed by a curved upper section 56 and a curved lower section 58 which are welded together at a circular joint 59. The upper section 56 is welded to the bottom of the material receiving box 40, and the lower section 58 projects downwardly and curves outwardly to form an outwardly projecting circular flange 63.

A fabricated conveyor or auger unit 70 includes an elongated tubular conduit 72 which encloses a rotatable auger 75 formed by a helical flight 77 welded to a center shaft 78. The lower portion of the conduit 72 includes parallel vertical side walls 81 and a sloping bottom end wall 82 which supports a hydraulic motor 85 having an output shaft 86 connected to drive the auger shaft 78. Hydraulic hoses 88 extend from the motor 85 to a hydraulic pump and control valves (not shown) on the tow vehicle.

A rectangular support plate 90 has an outer peripheral portion secured by a series of bolts 92 to an outwardly projecting flange 94 formed on the side walls 81 and end wall 82 of the lower end portion of the conduit 72. The plate 90 has an inwardly projecting and upwardly curved annular upper flange 96 which overlies the annular lower flange 63 on the auger support unit member 50 so that the lower end portion of a auger unit 70 is supported in suspended relation by the annular support member 50. The annular flange 96 defines a circular center opening 98 which is smaller than the outer diameter of the flange 63 but larger than the outside throat diameter of the support member 50 at the welded joint 59.

Referring to FIG. 1, the upper or outer end portion of the auger unit 70 has a discharge opening surrounded by discharge spout 104 which projects downwardly from the tubular conduit 72. In a stow position (FIG. 1) of the auger unit 70, the lower end portion of auger unit is supported by the annular support member 50, and the upper portion of the auger unit is supported by a bracket 106 secured to the left side wall of the hopper 20. A hand operated winch 100 has a crank 101 and is mounted on the conduit 72 of the auger unit 70. The winch 100 includes a drum, and a cable 112 extends from the drum around a pulley 114 mounted on the conduit and has an end portion secured to the hopper 20 by a plate 116.

Referring to FIGS. 2 and 3, a welded rod grate 120 is positioned within the bottom portion of the box 40 and has inverted U-shaped crossing rods 122 which are welded to the bottom wall of the box 40. The grate 120 prevents large objects, such as a rock, within the granular material from passing through the box 40 and the auger support member 50 and dropping into the inlet of the auger unit 70.

Referring to FIGS. 2–5, after the auger unit 70 is released from its upwardly and rearwardly projecting stow position resting on the bracket 106 (FIG. 1), the auger unit may be rotated approximately 180° on the vertical axis 53 and through an angle of 90° as shown in FIGS. 1 & 3, as a result of the upper flange 96 rotating on the lower flange 63. This rotation may be performed while granular material is feeding by gravity through the opening 52 of the auger support member 50 in order to deposit the material discharged through the spout 104 in the desired locations. In addition, by manually rotating the crank 101 of the winch 100 to retract or extend the cable 112, the auger unit 70 may be tilted in a vertical plane extending through the axis 53 and through an angle of about 15° on either side of the normal position shown in FIG. 2. For example, when the auger unit 70 is tilted downwardly, the upper flange 96 tilts outwardly on the lower flange 63, as shown in FIG. 4. When the auger unit is tilted upwardly, the upper flange 96 tilts in the opposite direction or inwardly on the lower flange 63, as shown in FIG. 5. This tilting may be performed at any rotational position of the auger unit 70 on the axis 53 and permits convenient positioning of the discharge spout 104 of the auger unit for discharging the granular material in the desired bins.

From the drawings and the above description, it is apparent that a conveyor or auger unit 70 and its annular support member 50 constructed in accordance with the invention provide desirable features and advantages. For example, the support structure is simple and inexpensive in construction and permits, in effect, universal tilting and rotational movement of the auger unit. The auger supporting structure also provides for unobstructed free flow of the granular material from the gravity flow box 40 into the auger conduit 72 regardless of the rotational or angular position of the auger unit. In addition, the support structure is self-centering after tilting and handles dry fertilizer without the fertilizer compacting and binding between the lower flange 63 and upper flange 96, thus allowing free and easy rotation of the auger unit. The auger support structure further avoids spattering of the granular material from the box 40 and permits the hydraulic motor 85 to be located on the lower end of the auger unit. This location is desirable in order to minimize the weight of the outer end portion of the auger unit and to minimize the length of the hydraulic hoses 88 extending to the motor. The auger support structure also provides for complete clean out of granular material from the hopper 20 and gravity flow box 40. While the form of granular material conveyor apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. A conveyor unit for granular material and adapted to be mounted on a wheel supported wagon including a container for transporting the material, said unit comprising an annular wall forming a tubular support member having a generally vertical axis and defining a passage, said support member including an outwardly projecting lower support flange, means for directing granular material from the container into said passage, an elongated conveyor conduit for conveying granular material and having a lower end portion and an upper end portion including means defining a discharge outlet, a power driven conveyor member within said conveyor conduit for conveying granular material from said lower end portion to said upper end portion and through said discharge outlet, said lower end portion of said conduit including an upper wall with an upper support flange disposed around said tubular support member above said lower support flange, said lower support flange supporting said upper support flange and said lower end portion of said conduit in suspended relation, said upper and lower support flanges cooperating to provide for substantial unrestricted rotation of said conveyor conduit through an angle of ninety degrees relative to said tubular support member generally on said axis to a selected angular position, said upper and lower support flanges cooperating to provide for unrestricted tilting said conduit in a generally vertical plane and relative to said tubular support member at any rotational position of said conduit, and said upper and lower support flanges cooperating to confine the granular material within said lower end portion of said conveyor conduit.

2. A conveyor unit as defined in claim 1 wherein said upper and lower support flanges provide for rotating said conveyor conduit through an angle of about one hundred eighty degrees.

3. A unit as defined in claim 1 wherein said means for directing material from the container into said passage of said tubular support member comprise a material receiving box having a bottom wall, means for attaching said box to the container, and said tubular support member projects downwardly from said bottom wall of said box.

4. A conveyor unit for granular material and adapted to be mounted on a wheel supported wagon including a container for transporting the material, said unit comprising an annular wall forming a tubular support member having a generally vertical axis and defining a passage, said support member including an outwardly curved lower annular flange having a radius of curvature substantially greater than the thickness of said wall, means for directing material from the container into said passage, an elongated conveyor conduit having a lower end portion and an upper end portion including means defining a discharge outlet, a power driven conveyor member within said conveyor conduit for conveying material from said lower end portion to said upper end portion and through said discharge outlet, said lower end portion of said conduit including an upper wall extending around said tubular support member above said lower annular flange, said lower annular flange supporting said lower end portion of said conduit in suspended relation, said upper wall of said conduit and said lower annular flange cooperating to provide for substantial rotation of said conveyor conduit relative to said tubular support member generally on said axis to a selected angular position, said upper wall and said lower annular flange also cooperating to provide for tilting said conduit in a generally vertical plane and relative to said tubular support member at a selected rotational position of said conduit, and said upper wall and said lower annular flange further cooperating to provide for confining the granular material within said lower end portion of said conduit and for self-centering of said lower end portion of said conduit.

5. A unit as defined in claim 4 wherein said tubular support member has generally an hour-glass cross-sectional configuration.

6. A unit as defined in claim 4 wherein said means for directing material from the container into said passage of said tubular support member comprise a material receiving box having a bottom wall, means for attaching said box to the container, and said tubular support member projects downwardly from said bottom wall of said box.

* * * * *